Oct. 19, 1948.    D. P. LAVIETES    2,451,838
SMOKER'S PIPE
Filed July 9, 1946
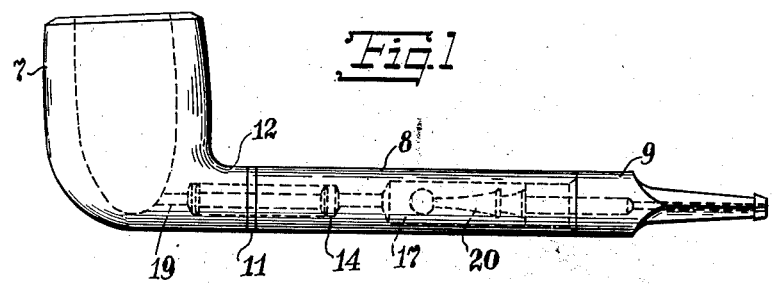
Fig.1
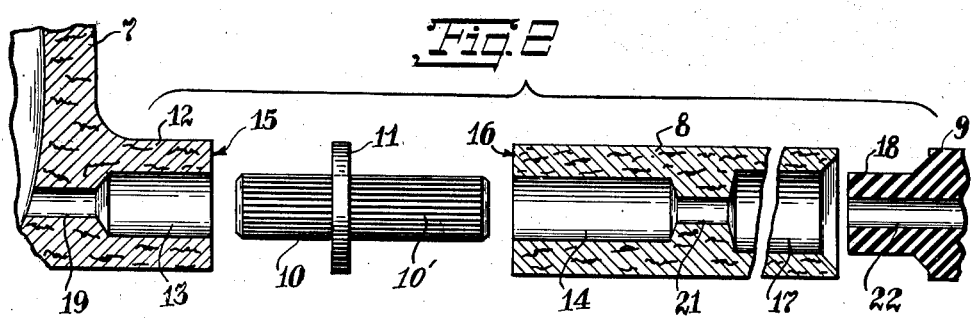
Fig.2
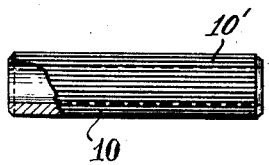
Fig.3
Fig.4
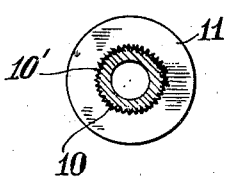
Fig.5
INVENTOR.
DAVID P. LAVIETES
BY
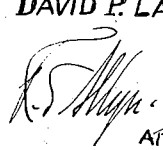
ATTORNEY Patented Oct. 19, 1948

2,451,838

UNITED STATES PATENT OFFICE 2,451,838

SMOKER'S PIPE

David P. Lavietes, Boone, N. C.

Application July 9, 1946, Serial No. 682,404

1 Claim. (Cl. 131—225)

My present invention relates particularly to pipes having bowls of wood such as briar root. Such a pipe usually has an integral shank or stem extending from the bowl and an elongated bit detachably secured to the extension shank.

I propose to use a bowl having a short integral shank to which one end of a tubular extension is secured by means of a special splicer tube and spacer. A short bit is then detachably secured to the outer end of this extension.

Fig. 1 is a side view of a pipe embodying my invention showing in dotted lines the interior construction.

Fig. 2 is an exploded side and sectional view showing the principal parts of the pipe on an enlarged scale.

Fig. 3 is a side view and partial section showing the splicer tube.

Fig. 4 is a cross sectional view of the spacer washer.

Fig. 5 is an end view showing the spacer washer in place on the splicer tube.

The three main parts of the pipe are the bowl member 7, the extension tube 8 and the bit member 9.

The first two parts are connected by a splicer tube 10 having a metallic spacer washer 11 mounted on the tube 10.

The bowl has a short shank 12 at its base in which a recess 13 is cut to receive the end of the splicer tube 10. The other end of the splicer tube fits in a recess 14 in the inner end of the extension tube 8. This tube 8 is also preferably made of briar wood.

The splicer tube is of metal such as aluminum and has fine teeth 10' cut longitudinally along its length so that when it is driven into the recess 13 in the shank of the bowl it will resist rotation by the engagement of the teeth with the side wall of the recess. A similar interlocking of the extension tube 8 with the splicer tube is effected in the same manner when the tube 8 is made of wood. The outside diameter of the splicer tube 10 before scoring it is approximately the same as the inside diameter of the washer. The spacer washer 11 may be forced onto the splicer tube 10 either before the splicer tube is inserted into the recess 13 in the shank or afterwards.

When one end of the splicer tube 10 is inserted in the recess 13 in the bowl shank 12 and the tubular extension 8 is applied to the other end of the splicer tube the spacer washer 11 which will by then have been placed on the splicer tube 10 will be forced to slide along the splicer tube 10 until the washer is tightly held between the rim 15 of the shank 12 and the rim 16 of the extension tube 8.

Suitable cement is usually applied to the outer wall of the splicer tube 10 and to the faces of the spacer washer 11 or to the surfaces of the recesses 13 and 14 and the end rims 15 and 16 before assembly so as to ensure permanent adhesion and effect a tight joint.

The extension tube 8 has a chamber 17 and the bit 9 has an extension 18 which frictionally or otherwise fits into the end of this chamber for adjustment or to enable the bit to be detached for cleaning out the chamber 17.

Such a construction greatly facilitates factory construction and assembly of the parts.

A small passage 19 connects the bowl chamber with the recess 13 and the passage through the splicer tube 10. A tubular or grooved guard member 20 of a conventional form may be mounted in the bit 18 in the usual manner and project into the chamber 17 of the extension tube 18 if desired.

The tubular member 8 has a passage 21 connecting the recesses 14 and 17 and of course the bit has a passage 22 of the usual type.

Such a construction makes it possible to use briar wood blanks having very short stub extensions such as 12. The extension 8 may be formed of the same type of wood if desired to provide an attractive appearance.

I claim:

A smoker's pipe comprising a wooden bowl member having a short shank with a recess therein, an elongated wooden tubular member forming an extension of said shank and having a recess in one end, an elongated metallic splicer tube having fine teeth cut lengthwise thereof along its outer surface and having one end bitingly secured in the recess in the shank of the bowl and having its other end bitingly secured in the recess in the end of the wooden tubular member, a bit member having one end secured to the other end of the wooden tubular member and a separate metallic washer member slidable lengthwise on the metallic splicer tube and sealed between the faces of said shank and said wooden extension member.

DAVID P. LAVIETES.

REFERENCES CITED

The following references are of record in the file of this patent:

UNITED STATES PATENTS

| Number | Name | Date |
|---|---|---|
| 80,527 | Young | July 28, 1868 |
| 90,554 | Kaldenberg | May 25, 1869 |
| 1,989,069 | Warnke | Jan. 22, 1935 |
| 2,262,660 | Warnke | Nov. 11, 1941 |
| 2,317,180 | Daignault | Apr. 20, 1943 |
| 2,378,175 | Benedict | June 12, 1945 |

FOREIGN PATENTS

| Number | Country | Date |
|---|---|---|
| 584,501 | France | Nov. 21, 1924 |
| 229,516 | Great Britain | Feb. 26, 1925 |